United States Patent Office 3,226,448
Patented Dec. 28, 1965

3,226,448
PREPARATION OF FLUORINE COMPOUNDS
Joseph Gordon, Morristown, Henry R. Nychka, Randolph Township, Morris County, and Cyril Woolf, Morristown, N.J., assignors to Allied Chemical Corporation, New York, N.Y., a corporation of New York
No Drawing. Filed Dec. 20, 1962, Ser. No. 245,961
10 Claims. (Cl. 260—650)

This invention relates to processes for manufacture of aromatic fluorides.

As known, aromatic fluorides constitute a class of materials particularly useful as intermediates in the preparation of dyestuffs and biologically active compounds. However, largely because of synthesis difficulties many aromatic fluorides have been relatively unavailable or notably expensive. Certain aromatic fluorides have been prepared by reacting an aromatic compound containing chlorine with KF or NaF. This route is disadvantageous because aromatically bound halogen, e.g. chlorine, of the aromatic starting material must be strongly activated by at least one or more negative substituents such as the nitro, carboxy, ester, acetyl, or trifluoromethyl groups, and because use of the alkali metal fluoride as a fluorinating agent requires use of expensive or high boiling solvents such as dimethyl sulfoxide, dimethylformamide or acetic acid in order to produce the fluorinated aromatics. It has also been proposed to employ KF as a fluorinating agent in the absence of a solvent, but this method necessitates use of a starting material containing at least two electronegative groups. The Schiemann process and modifications thereof for producing aromatic fluorides by diazotization of an amine and the subsequent decomposition of diazonium salt in the presence of HF or fluoroboric acid are known. These procedures require use of an aromatic starting material containing an amino group coupled with the disadvantage that only one fluorine atom can be introduced into the product formed during a given process cycle. In general, prior methods for making aromatic fluorides from aromatic halides are procedurally cumbersome and relatively complicated.

The major object of this invention lies in the provision of simple gas-phase, solid catalyst methods for fluorinating certain aromatic halides, e.g. chloro and/or bromo, to produce aromatic fluorides.

It has been found that, when certain gas-phase aromatic halide starting materials containing non-fluorine halogen are subjected to the action of certain gas-phase fluorinating agents at relatively elevated temperatures and while in the presence of a certain catalyst, aromatic fluorides may be produced by simple metathetical exchange of aromatically bound non-fluorine halogens of the starting materials for fluorine contained in the fluorinating agent. More particularly, it has been found that certain aromatic halides containing halogen other than fluorine may be reacted conveniently in gas-phase, at relatively elevated temperatures and while in the presence of cobaltous fluoride ($CoF_2$) catalyst, with nitrosyl fluoride material fluorinating agent of the group consisting of nitrosyl fluoride (NOF), and nitrosyl fluoride-hydrogen fluoride complex, namely NOF·$x$HF, or mixtures of both, to form fluorinated or more highly fluorinated aromatic compounds. The invention involves the discovery of the conjunctive relation of the fluorinating properties of the indicated fluorinating agents, the catalysis properties of cobaltous fluoride, and certain other operating conditions which interdependently effect the simple metathetical or replacement exchange stated above.

Nitrosyl fluoride, a known and available normally colorless gas compound having a boiling point of about minus 56° C., may be made, as known, by passing nitrosyl chloride over silver fluoride in a platinum tube at elevated temperatures, or by direct reaction of nitric oxide and elemental fluorine. The nitrosyl fluoride-hydrogen fluoride complexes, NOF·$x$HF, utilized as a reactant in accordance with the present invention, may be made by reaction of nitrosyl chloride and anhydrous HF, for example as follows.

The reactor employed was an unpacked nickel tube 1″ I.D. x 36″ long mounted in an electrically heated furnace 30″ long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel "Heliopak," and provided at the top with a reflux condenser cooled by Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol) of a fraction boiling in the range of minus 5 to zero degrees C. and comprising mostly NOCl; about 85 gms. (4.3 mols) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and had a boiling point of about 68° C. (atmospheric pressure), and was liquid NOF·6HF complex. The pot residue fraction on redistillation showed a boiling point of about 95° C. (atmospheric pressure), and was liquid NOF·3HF complex. NOF is ordinarily available in liquid or gas form. The NOF·3HF complex is usually initially in the form of a liquid which, if all NOF·3HF complex, boils at about 95° C. The NOF·6HF complex is usually in the form of a liquid which, if all NOF·6HF complex, boils at about 68° C. The complexes, which may be represented by NOF·$x$HF where $x$ is 3 or 6, may be available as liquid mixtures of such proportions that $x$ may vary within the limits of 3 to 6 inclusive.

The catalysts used in practice of the invention may be prepared from a cobaltous salt such as the chloride or nitrate. Both anhydrous and hydrated salts may be used. A convenient, commercially available starting material is cobaltous chloride hexahydrate ($CoCl_2 \cdot 6H_2O$). The cobaltous salt is characterized by its ability to react with anhydrous HF at moderately elevated temperatures. The anhydrous salt may be compacted or pelletized, or the hydrated salt may be preliminarily dried at about 110–150° C. prior to being compacted or pelletized. Particles of compacted or pelletized cobaltous salt are preferably of an average size of about one eighth of the diameter of the tubular reactor used for fluorination. The particles of cobaltous salt are then charged to a suitable reactor, such as tubular nickel reactor externally heated, and the temperature is raised to 200–600° C. with anhydrous HF flowing. Preferred operating temperature is 350–450° C. Reaction is in accordance with $CoCl_2 + 2HF = CoF_2 + 2HCl$, and passage of HF is continued until evolution of HCl and/or water of reaction (from oxy or hydroxy salts) substantially ceases. The catalyst is then ready for use.

The invention affords the notable advantage of applicability to a large class of starting materials. In carrying out the invention, there may be employed as organic starting materials mono- or polycyclic aromatic halides free from basic substituents and containing at least one aromatically bound halogen atom having an atomic number of 17 to 35, and at least one aromatically bound hydrogen atom on each ring. The expression "aromatic halide free from a basic substituent" denotes a compound which is free from a substituent which, when present in the molecule, makes the molecule behave as a base in terms of the classical theory of acids and bases. More particularly, the aromatic halides are selected from the group consisting of those in which the aromatic radical is not further substituted, as hereinabove described, and those in which the aromatic radical is further substituted by replacement of one or more of the remaining nuclear hydrogen atoms, in excess of one, by substituents selected from the group consisting of alkyl cycloalkyl, lower alkoxy, fluoro, carboxy, hydroxy, nitro and sulfo. Ordinarily, starting materials contain a maximum of three benzene rings, preferably in fused ring form. In polycyclic aryl compounds, reactive halogen may be attached to more than one ring, and the compounds may comprise non-aromatic rings attached to a halogen bearing aryl ring. As employed herein, including the claims, the term aromatic hydrocarbon denotes and includes unsubstituted aromatic hydrocarbons and their homologues. In the better embodiments of the invention, the aromatic halides are those in which the aromatic radical is that of a mono-nuclear aromatic hydrocarbon or a derivative thereof in which 1 to 4 and preferably not more than one nuclear hydrogen atoms are replaced by substituents selected from the group consisting of cycloalkyl, lower alkoxy, bromo, chloro, carboxy, hydroxy, nitro and sulfo. Most desirable starting materals are halo-benzenes containing at least one and preferably at least 2 nuclear hydrogen atoms, and no substituents other than aromatically bound halogen having an atomic number less than 53, and preferably no substituents other than aromatically bound halogen having an atomic number of 17 to 35. With regard to mono-nuclear compounds, as employed herein, including the claims, the term "mono-nuclear aromatic hydrocarbon" denotes and includes benzene and its homologues.

Reactions involved in practice of typical embodiments of the invention may be represented by—

(1)
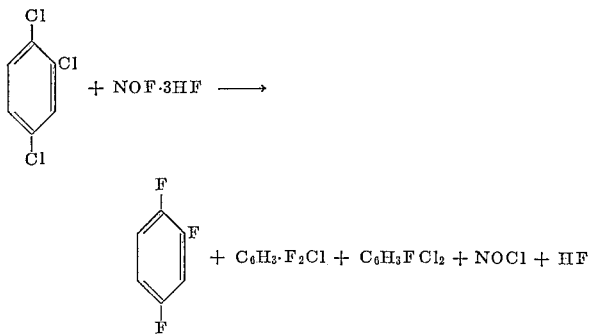

(2)
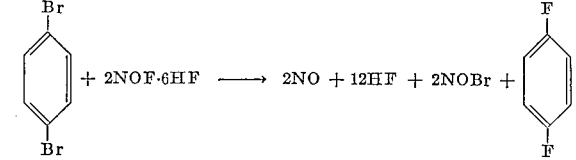

and (3)
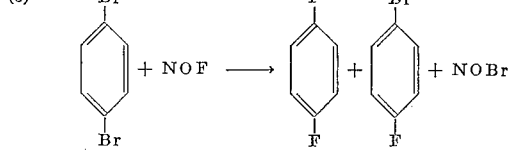

Other aromatic halides, free from basic substituents and containing at least one aromatically bound halogen atom having an atomic number of 17 to 35 and containing at least one aromatically bound hydrogen atom, which may be used as organic starting materials in practice of the invention may include

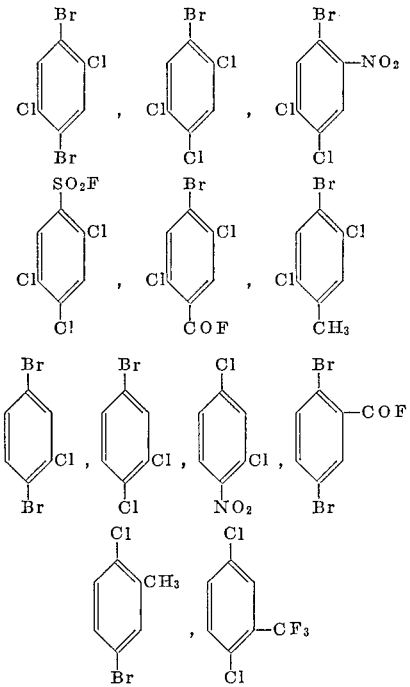

General practice of the invention process comprises introducing into a reaction zone a described starting material in gas phase and gaseous fluorinating agent of the group consisting of NOF, NOF·$x$HF complexes in which $x$ is 3 or 6, and mixtures of any two or all three. In the reaction zone, the starting material and the fluorinating agent are heated to certain elevated temperatures and for a time sufficient to effect fluorination of a substantial amount of the starting material, and there is discharged from the reaction zone reaction products containing fluorinated aromatic hydrocarbon containing more fluorine than the initial starting material. The process may be carried out by continuously passing metered quantities of starting material and fluorinating agent described into and thru a suitable tubular reactor, packed with the catalyst described, and mounted in an electrically heated furnace and connected to a product recovery system. The reactor and other equipment may be made of nickel, Monel or Inconel, or other material corrosive-resistant to reactants and products formed.

Significant reaction appeared to threshold at temperatures as low as about 250° C. Temperatures higher than about 600° C. are not preferred because of excessive carbonization and side reactions. For good rate of reaction and minimization of carbonization and side reactions, temperatures substantially in the range of 300–450° C. are preferred.

While sub- or super-atmospheric pressures may be employed, the invention affords notable advantage of operation at substantially atmospheric pressure. It will be undertsood that in the practice of gas-phase processes of the general type described herein, i.e. processes in which a gas stream is flowed successively thru reaction and product recovery systems, for all practical purposes, as relate to reactions themselves, pressure is considered as being substantially atmospheric. Technically, pressures in such systems are sufficiently on the positive side to effect commercially satisfactory gas flow thru the apparatus train. However, depending upon factors such as apparatus design, packing in the reactor, desired contact time, etc., actual pressures in systems of the kind under consideration may vary from 2 up to say 10–15 pounds gauge, and accordingly operations of this type are included in the designation of substantially atmospheric pressure.

With regard to ratios of fluorinating agent to starting material, whether the fluorinating agent is NOF, or either of the described complexes, or any mixtures of two or all of the fluorinating agents stated, theoretical requirements are believed to be approximately one mol of fluorinating agent (basis NOF constituent) per atom of halogen, having an atomic number of 17 to 35, in the starting material. Experience indicates that fluorinating agent to starting material ratios may vary rather widely, and in this connection ratio of mols of NOF constituent of the fluorinating agent per atom of halogen, having an atomic number of 17 to 35, in the starting material may lie in the range of about 0.5:1 to 5:1. It has been found that notably good results may be obtained when reactor feed is regulated so as to charge into the reaction zone quantities of starting material and fluorinating agent such as to provide a ratio of mols of NOF constituent of the fluorinating agent per atom of halogen, having an atomic number of 17 to 35, in the starting material substantially in the preferred range of 0.7:1 to 2:1.

Contact time may be varied considerably without noticeable disadvantage to high process efficiency. Generally, increasing contact time and reactor temperature results in higher reactivity, although too great contact time, while increasing fluorination may increase side reactions. Significant conversions are effected at contact times as short as one second. However, contact times usually may lie in the range of 1–60 seconds, preferably 5–25 seconds. To a substantial extent, contact time, reactor temperature and ratio of reactants are interrelated, and depending upon apparatus and the particular operation at hand, optimum conditions as to contact time may be determined by test runs.

Product recovery may be effected by technique more or less conventional in this art. The reactor exit contains sought-for product or products, and may contain, in addition to some unreacted starting material, some unreacted NOF or NOF complex, some NOX by-product where X is chlorine or bromine, some unreacted HF and possibly some HCl or HBr formed by minor side reaction of HF with NOCl and NOBr respectively. The reactor exit may contain some aromatic fluorides which may be considered as under-fluorinated materials as distinguished from higher fluorinated sought-for products. Since for example NOCl may be formed as a by-product, some minor chlorination of the aryl halide reactant and its products may occur, the reactor exit may possibly contain small amounts of compounds such as $C_6H_2Cl_4$, $C_6H_2F_2Cl_2$ and $C_6H_2FCl_3$. The reactor exit gas stream may be put thru a water scrubber operated at temperatures substantially in the range of 25 to 50° C. Because of the high boiling points of all of the starting materials and fluorinated products formed such compounds are condensed out of the gas stream in the scrubber and may be recovered as a lower oil phase from the scrubber liquor. Any unreacted low boiling NOF hydrolyzes to nitrous acid and HF, while any unreacted complex may be condensed in the scrubber. The crude oil phase recovered from the scrubber liquor may be water-washed, dried and fractionally distilled to separately recover sought-for product or products, under-fluorinated aromatic fluorides, and unreacted organic starting material. Under-fluorinated aromatic fluorides and unreacted starting organic materials may be recycled.

The cobaltous fluoride ($CoF_2$) catalyst used in the appended examples, demonstrating practice of the invention was prepared as follows. About 3860 g. of $$CoCl_2 \cdot 6H_2O$$

were dried at 125–150° C. for 48 hours. The resulting blue solid was pelleted to about ⅛" x ⅜" size. About 1645 g. of the pellets were placed in a 2" I.D. x 30" long Monel tubular reactor. A total of about 2915 g. of anhydrous HF gas was passed thru the reactor for about 33 hours, at the end of which time the mol ratio of HF to HCl of the exit gases was about 80 to 1. Analysis of the freshly prepared catalyst showed percent Co, 60.8 found; 60.8 theory; and percent F, 38.0 found; 39.2 theory. The following X-ray examination data confirmed the material to be tetragonal, anhydrous $CoF_2$:

| $I/I_0$ | d A. |
|---|---|
| 100 | 3.34 |
| 70 | 2.64 |
| 40 | 2.30 |
| 80 | 1.76 |
| 30 | 1.66 |
| 10 | 1.59 |
| 10 | 1.49 |
| 10 | 1.41 |
| 10 | 1.35 |

*Example 1.*—The NOF·$x$HF complex employed was made substantially as by the procedure above detailed and was a mixture of NOF·3HF and NOF·6HF initially in proportions such that $x$ had a value of about 5.1. The tubular Monel reactor utilized was the same as above and was charged with about 1200 g. of $CoF_2$ pellets. About 1.07 mols (195 g.) of vaporous 1,2,4-trichlorobenzene (B.P. 219° C.) and about 4.40 mols (668 g.) of vaporous NOF·$x$HF complex were concurrently introduced over a 5.5 hour period. Temperatures throughout the run were in the range of 406–430° C. During reaction, rate and extent of fluorination were followed by periodic check of the amount of ionic chlorine liberated, a total of 1.24 mols were found. Crude product was recovered as a lower oil phase in a water scrubber immediately following the reactor. The crude was water-washed, dried, and distilled, and the following fractions were recovered. Infrared analyses of these fractions showed the benzenoid structure.

| Product | B.P., ° C. | Mol Percent Yield | Percent Cl | Th. | Percent F | Th. |
|---|---|---|---|---|---|---|
| 1,2,4-$C_6H_3F_3$[1] | 83–93 | 15 | 2.2 | nil | 39.0 | 43.2 |
| $C_6H_3F_2Cl$ | 125–132 | 24 | 22.0 | 23.9 | 28.0 | 25.6 |
| $C_6H_2F_2Cl_2$ | 161–169 | 20 | 38.6 | 38.8 | 19.0 | 20.8 |
| $C_6H_2FCl_3$ | 210 | 9 | | | | |
| Residue | | [2] 4 | | | | |

[1] B.P., ° C., 88° C. (literature).
[2] calculated as $C_6Cl_6$.

Yields indicated are mol percent on the basis of organic starting material converted.

*Example 2.*—The NOF·$x$HF complex used was made as above and was a mixture of the two complexes initially in proportions such that $x$ had a value of about 3.5. The reactor, same as above, was charged with about 1200 g. of $CoF_2$ pellets. About 1.74 mols (410 g.) of 1,4-dibromobenzene (B.P. 218° C.) and about 2.72 mols of NOF·$x$HF complex was concurrently introduced into the reactor during a 2.3 hour period while temperatures were maintained substantially in the range of 318–323° C. The total amount of ionic bromine liberated was equal to 1.65 mols. Recovery and distillation of crude resulted in the following:

| | B.P., ° C. | B.P., ° C.[1] | Mol Percent Yield | Percent Br |
|---|---|---|---|---|
| 1,4-difluorobenzene | 82–95 | 88.5 | 20 | nil |
| 1,4-fluorobromobenzene | 150–155 | 152 | 40 | [2] 45.7 |

[1] Literature, B.P., ° C.
[2] Theory, Br—45.6%.

Upon further distillation, 0.55 mol of unreacted dibromobenzene was recovered. Infrared analysis of the above products showed benzenoid structure.

*Example 3.*—The NOF used was made by reaction of NO and $F_2$ in mol proportions of e.g. 2:1 at room temperature or a little above. The reactor employed was a 1″ I.D. x 36″ long Monel tube containing about 300 ml. of 6–14 mesh $CoF_2$. About 2.6 mols (130 g.) of NOF and 1.0 mol (180 g.) of 1,2,4-trichlorobenzene were simultaneously fed into the reactor during a 3.5 hour period in which temperature was substantially in the range of 380–390° C. A total of 0.51 mol of ionic chlorine was liberated. Recovery and distillation of crude product gave the following fractions:

| Fraction | B.P., °C. | Mol Percent Yield | Percent Cl | Th. | Percent F | Th. |
|---|---|---|---|---|---|---|
| $1,2,4\text{-}C_6H_3F_3$ | 90–100/1 atm | 8 | | | | |
| $C_6H_3F_2Cl$ | 25–32/9 mm | 7 | 24.0 | 23.9 | | |
| $C_6H_2F_2Cl_2$ | 50–59/9 mm | 14 | 31.1 | 38.8 | 22.0 | 20.8 |
| $C_6H_2FCl_3$ | 80–84/9 mm | 8 | 52.0 | 53.2 | | |

Yields indicated are mol percent on the basis of starting material fed.

The herein outlined method for making NOF·3HF and NOF·6HF complexes, from NOCl and HF, is more fully described and claimed in Anello-Woolf copending application Serial No. 77,805, filed December 23, 1960.

We claim:

1. The process for preparing an aromatic fluoride which comprises introducing into a reaction zone (1) a gas-phase aromatic halide starting material, said aromatic halide containing at least one aromatically bound halogen atom having an atomic number of 17 to 35, and containing at least one aromatically bound hydrogen atom on each ring, said aromatic halide being selected from the group consisting of those aromatic halides in which the aromatic radical is a further unsubstituted aromatic hydrocarbon, and derivatives of the same in which nuclear hydrogen atoms in excess of one on each aromatic ring are replaced by substituents selected solely from the group consisting of alkyl, cycloalkyl, lower alkoxy, fluoro, carboxy, hydroxy, nitro and sulfo, and (2) a gas-phase fluorinating agent selected from the group consisting of NOF, NOF·3HF, NOF·6HF, and mixtures thereof; heating said starting material and said fluorinating agent in said zone to temperatures substantially in the range of 250–600° C. and while in the presence of $CoF_2$ catalyst, to effect fluorination of a substantial amount of said starting material, and discharging from said zone reaction products comprising aromatic fluoride containing more fluorine than said starting material.

2. The process of claim 1 in which the aromatic halide starting material contains a maximum of three fused benzene rings.

3. The process of claim 1 in which the aromatic halide starting material is mono-nuclear.

4. The process of claim 1 in which reaction temperatures are substantially in the range of 300–450° C.

5. The process of claim 1 in which the ratio of mols of NOF constituent of the fluorinating agent per mol of halogen, having an atomic number of 17 to 35, in the starting material is substantially in the range of 0.5:1 to 5:1.

6. The process of claim 1 in which the aromatic halide starting material is 1,2,4-trichlorobenzene, and reaction temperature is substantially in the range of 300–450° C.

7. The process of claim 1 in which the aromatic halide starting material is 1,4-dibromobenzene, and reaction temperature is substantially in the range of 300–450° C.

8. The process for preparing an aromatic fluoride which comprises introducing into a reaction zone (1) a gas-phase halo-benzene starting material, said halo-benzene containing at least one aromatically bound halogen atom having an atomic number of 17 to 35, and containing at least one aromatically bound hydrogen atom, and containing no substituents other than aromatically bound halogen having an atomic number less than 53, and (2) a gas-phase fluorinating agent selected from the group consisting of NOF, NOF·3HF, NOF·6HF, and mixtures thereof; heating said starting material and said fluorinating agent in said zone to temperatures substantially in the range of 250–600° C. and while in the presence of $CoF_2$ catalyst, to effect fluorination of a substantial amount of said starting material, and discharging from said zone reaction products comprising aromatic fluoride containing more fluorine than said starting material.

9. The process for preparing an aromatic fluoride which comprises introducing into a reaction zone (1) a gas-phase halo-benzene starting material, said halo-benzene containing at least one aromatically bound halogen atom having an atomic number of 17 to 35, and containing at least one aromatically bound hydrogen atom, and containing no substituents other than aromatically bound halogen having an atomic number less than 53, and (2) a gas-phase fluorinating agent, selected from the group consisting of NOF, NOF·3HF, NOF·6HF, and mixtures thereof, in amount such that the ratio of mols of NOF constituent of the fluorinating agent per mol of halogen, having an atomic number of 17 to 35, in the starting material is substantially in the range of 0.7:1 to 2:1; heating said starting material and said fluorinating agent in said zone to temperatures substantially in the range of 300–450° C. and while in the presence of $CoF_2$ catalyst, to effect fluorination of a substantial amount of said starting material, and discharging from said zone reaction products comprising aromatic fluoride containing more fluorine than said starting material.

10. The process of claim 9 in which reaction is carried out at substantially atmospheric pressure.

References Cited by the Examiner

Seed et al.: "Angewandte Chemie," vol. 73, pp. 521–2 (1961).

LEON ZITVER, *Primary Examiner.*